(12) United States Patent
Krueger (10) Patent No.: US 7,149,853 B2
(45) Date of Patent: Dec. 12, 2006

(54) SYSTEM AND METHOD FOR SYNCHRONIZATION FOR ENFORCING MUTUAL EXCLUSION AMONG MULTIPLE NEGOTIATORS

(75) Inventor: Phillip E. Krueger, Lake Oswego, OR (US)

(73) Assignee: PolyServe, Inc., Beaverton, OR (US)

( * ) Notice: Subject to any disclaimer, the term of this patent is extended or adjusted under 35 U.S.C. 154(b) by 89 days.

(21) Appl. No.: 10/251,689

(22) Filed: Sep. 20, 2002

(65) Prior Publication Data

US 2003/0065896 A1 Apr. 3, 2003

Related U.S. Application Data

(60) Provisional application No. 60/324,196, filed on Sep. 21, 2001, provisional application No. 60/324,226, filed on Sep. 21, 2001, provisional application No. 60/324,224, filed on Sep. 21, 2001, provisional application No. 60/324,242, filed on Sep. 21, 2001, provisional application No. 60/324,195, filed on Sep. 21, 2001, provisional application No. 60/324,243, filed on Sep. 21, 2001, provisional application No. 60/324,787, filed on Sep. 24, 2001, provisional application No. 60/327,191, filed on Oct. 1, 2001.

(51) Int. Cl.
*G06F 12/00* (2006.01)

(52) U.S. Cl. ............... 711/150; 711/151; 711/168
(58) Field of Classification Search ............... 711/147, 711/150, 154, 155, 152, 158, 156, 163, 164, 711/168; 710/200–244; 714/42, 51, 52; 707/8

See application file for complete search history.

(56) References Cited

U.S. PATENT DOCUMENTS

| | | | |
|---|---|---|---|
| 5,276,872 A | 1/1994 | Lomet et al. | 707/202 |
| 5,438,464 A | 8/1995 | Lewis et al. | 360/73.03 |
| 5,678,026 A | 10/1997 | Vartti et al. | 711/152 |
| 5,751,992 A | 5/1998 | Bhargava et al. | 711/130 |
| 5,813,016 A | 9/1998 | Sumimoto | 707/201 |
| 5,850,507 A | 12/1998 | Ngai et al. | 714/16 |
| 5,909,540 A | 6/1999 | Carter et al. | 714/4 |
| 5,913,227 A | 6/1999 | Raz et al. | 711/152 |
| 5,920,872 A | 7/1999 | Grewell et al. | 707/202 |
| 5,953,719 A | 9/1999 | Kleewein et al. | 707/8 |
| 5,960,446 A | 9/1999 | Schmuck et al. | 707/205 |
| 5,987,506 A | 11/1999 | Carter et al. | 709/213 |

(Continued)

FOREIGN PATENT DOCUMENTS

US  2001/0042221  11/2001  ............... 714/5

(Continued)

OTHER PUBLICATIONS

Wang et al., "Priority Inheritance Spin Locks for Multiprocessor Real-Time Systems," IEEE 1087-4089/96, 1996, pp. 70-76.*

(Continued)

*Primary Examiner*—Matthew Kim
*Assistant Examiner*—Shane M. Thomas
(74) *Attorney, Agent, or Firm*—Van Pelt, Yi & James LLP (57) ABSTRACT

A system and method are disclosed for providing a synchronization mechanism for access to shared information. According to an embodiment of the present invention, a lock with more than one part can be obtained or leased by writing to the first part, writing to the second part, reading the first part to determine whether the first part reads what was written to it, and obtaining the lock if what is read is the same as what was written.

21 Claims, 8 Drawing Sheets

U.S. PATENT DOCUMENTS

| | | | |
|---|---|---|---|
| 6,009,426 A * | 12/1999 | Jouenne et al. | 707/8 |
| 6,009,466 A | 12/1999 | Axberg et al. | 709/220 |
| 6,021,508 A | 2/2000 | Schmuck et al. | 714/4 |
| 6,026,474 A | 2/2000 | Carter et al. | 711/202 |
| 6,044,367 A | 3/2000 | Wolff | 707/2 |
| 6,108,654 A | 8/2000 | Chan et al. | 707/8 |
| 6,108,757 A * | 8/2000 | Arshad | 711/152 |
| 6,154,512 A | 11/2000 | Homan | 375/376 |
| 6,163,855 A | 12/2000 | Shrivastava et al. | 714/4 |
| 6,173,293 B1 * | 1/2001 | Thekkath et al. | 707/201 |
| 6,226,717 B1 * | 5/2001 | Reuter et al. | 711/147 |
| 6,256,740 B1 | 7/2001 | Muller et al. | 713/201 |
| 6,269,410 B1 | 7/2001 | Spasojevic | 710/5 |
| 6,272,491 B1 | 8/2001 | Chan et al. | 707/8 |
| 6,370,625 B1 | 4/2002 | Carmean et al. | 711/152 |
| 6,421,723 B1 | 7/2002 | Tawil | 709/224 |
| 6,473,819 B1 * | 10/2002 | Jackson et al. | 710/200 |
| 6,865,549 B1 * | 3/2005 | Connor | 705/51 |
| 2003/0217241 A1 * | 11/2003 | Chong et al. | 711/163 |

FOREIGN PATENT DOCUMENTS

| | | | |
|---|---|---|---|
| US | 2002/0069340 | 6/2002 | 711/203 |
| US | 2002/0091854 | 7/2002 | 709/236 |
| US | 2002/0101946 | 8/2002 | 375/376 |
| US | 2002/0150126 | 10/2002 | 370/503 |

OTHER PUBLICATIONS

Lomet, David; *Private Locking and Distributed Cache Management*; Proceedings of the Third International Conference on Parallel and Distributed Information Systems (PDIS 94), Austin, TX; Sep. 28-30, 1994.

* cited by examiner

SYSTEM AND METHOD FOR SYNCHRONIZATION FOR ENFORCING MUTUAL EXCLUSION AMONG MULTIPLE NEGOTIATORS

CROSS REFERENCE TO RELATED APPLICATIONS

This application claims priority to U.S. Provisional Patent Application No. 60/324,196 entitled SHARED STORAGE LOCK: A NEW SOFTWARE SYNCHRONIZATION MECHANISM FOR ENFORCING MUTUAL EXCLUSION AMONG MULTIPLE NEGOTIATORS filed Sep. 21, 2001, which is incorporated herein by reference for all purposes.

U.S. Provisional Patent Application No. 60/324,226 entitled JOUNALING MECHANISM WITH EFFICIENT, SELECTIVE RECOVERY FOR MULTI-NODE ENVIRONMENTS filed Sep. 21, 2001, is incorporated herein by reference for all purposes.

U.S. Provisional Patent Application No. 60/324,224 entitled COLLABORATIVE CACHING IN A MULTI-NODE FILESYSTEM filed Sep. 21, 2001, is incorporated herein by reference for all purposes.

U.S. Provisional Patent Application No 60/324,242 entitled DISTRIBUTED MANAGEMENT OF A STORAGE AREA NETWORK filed Sep. 21, 2001, is incorporated herein by reference for all purposes.

U.S. Provisional Patent Application No. 60/324,195 entitled METHOD FOR IMPLEMENTING JOURNALING AND DISTRIBUTED LOCK MANAGEMENT filed Sep. 21, 2001, which is incorporated herein by reference for all purposes.

This application claims priority to U.S. Provisional Patent Application No. 60/324,243 (Attorney Docket No. POLYP007+) entitled MATRIX SERVER: A HIGHLY AVAILABLE MATRIX PROCESSING SYSTEM WITH COHERENT SHARED FILE STORAGE filed Sep. 21, 2001, is incorporated herein by reference for all purposes.

U.S. Provisional Patent Application No. 60/324,787 entitled A METHOD FOR EFFICIENT ON-LINE LOCK RECOVERY IN A HIGHLY AVAILABLE MATRIX PROCESSING SYSTEM filed Sep. 24, 2001, is incorporated herein by reference for all purposes.

U.S. Provisional Patent Application No. 60/327,191 entitled FAST LOCK RECOVERY: A METHOD FOR EFFICIENT ON-LINE LOCK RECOVERY IN A HIGHLY AVAILABLE MATRIX PROCESSING SYSTEM filed Oct. 1, 2001, is incorporated herein by reference for all purposes.

This application is related to co-pending U.S. patent application Ser. No. 10/251,626 entitled SYSTEM AND METHOD FOR JOURNAL RECOVERY FOR MULTINODE ENVIRONMENTS filed concurrently herewith, which is incorporated herein by reference for all purposes; and co-pending U.S. patent application Ser. No. 10/251,645 entitled A SYSTEM AND METHOD FOR COLLABORATIVE CACHING IN A MULTINODE SYSTEM filed concurrently herewith, which is incorporated herein by reference for all purposes; and co-pending U.S. patent application Ser. No. 10/251,690 entitled A SYSTEM AND METHOD FOR MANAGEMENT OF A STORAGE AREA NETWORK filed concurrently herewith, which is incorporated herein by reference for all purposes; and co-pending U.S. patent application Ser. No. 10/251,894 entitled SYSTEM AND METHOD FOR IMPLEMENTING JOURNALING IN A MULTI-NODE ENVIRONMENT filed concurrently herewith, which is incorporated herein by reference for all purposes; and co-pending U.S. patent application Ser. No. 10/251,895 entitled A SYSTEM AND METHOD FOR A MULTI-NODE ENVIRONMENT WITH SHARED STORAGE filed concurrently herewith, which is incorporated herein by reference for all purposes; and co-pending U.S. patent application Ser. No. 10/251,893 entitled A SYSTEM AND METHOD FOR EFFICIENT LOCK RECOVERY filed concurrently herewith, which is incorporated herein by reference for all purposes.

FIELD OF THE INVENTION

The present invention relates generally to computer systems. More specifically, it relates to a synchronization mechanism for use with multiple negotiators.

BACKGROUND OF THE INVENTION

Servers are typically used for big applications and workloads such as those used in conjunction with large web services and manufacturing. Often, a single server does not have enough power to perform the required application. To accommodate these large applications, several servers may be used in conjunction with several shared storage devices in a storage area network (SAN). In order to accomplish synchronization, a lock may be used.

Some hardware, such as disk storage, typically does not support an atomic test-and-set operation, atomic swap operation, or equivalent operation on shared storage. A potential problem with the use of locks with this type of hardware is in the instance where a first node reads the lock, sees that it is available, then writes to the lock to claim it. In the meantime, after the first node has read the lock but before it has written to the lock, a second node reads the same lock and sees that it is available, then writes to the lock, claiming it as well. Accordingly, both nodes may think that they have control over the lock, and therefore try to alter the shared data.

A proposed solution is to reserve a separate area in the lock corresponding to each node or application to write in so that there are substantially as many reserved lock areas as nodes or applications. By doing so, an algorithm can be devised that avoids the problem described in the preceding paragraph. A potential problem with this solution is the large amount of space that may be required to hold in reserve for the various nodes and applications which may need to access shared data. Additionally, the set of nodes or applications may change over time and accommodating this change would be very difficult.

What is needed is a system and method for synchronizing mutual exclusion among multiple negotiators that does not require hardware support for an atomic test and set or swap equivalent on the shared storage, that does not require the reservation of a large amount of shared storage space and that can be dynamic to accommodate changes to the set of negotiators. The present invention addresses such needs.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
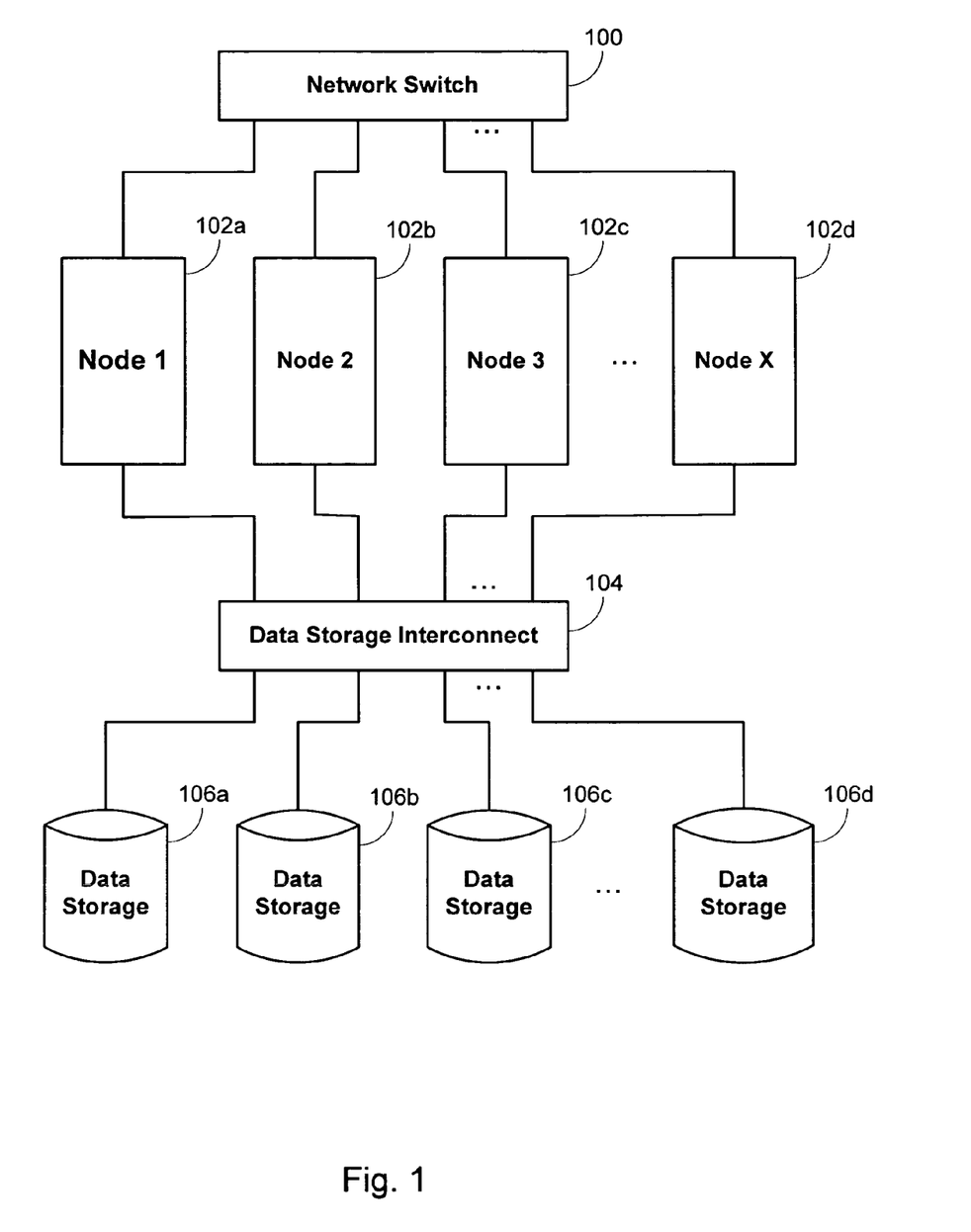
FIG. 1 is a block diagram of a shared storage system suitable for facilitating the synchronization mechanism according to an embodiment of the present invention.

FIG. 1 is a block diagram of a shared storage system suitable for facilitating the synchronization mechanism according to an embodiment of the present invention. In this example, nodes 102A–102D are coupled together through a network switch 100. The network switch 100 can represent any network infrastructure such as an Ethernet. Additionally, the nodes 102A–102D are also shown to be coupled to a data storage interconnect 104. An example of the data storage interconnect 104 is a fiber channel switch, such as a Brocade 3200 the fiber channel switch. Examples of nodes 102A–102D include but are not limited to computers, servers, and any other processing units or applications that can share storage or data. The data interconnect 104 is shown to be coupled to shared storage 106A–106D. Examples of shared storage 106A–106D include any form of storage such as hard drive disks, compact disks, tape, and random access memory.

The term node, as used herein, is intended to include all possible negotiators of any system that requires a synchronization mechanism for enforcing mutual exclusion among multiple negotiators. Examples, of node, as used herein, include but are not limited to servers, computers, and applications.

Although the system shown in FIG. 1 is a multiple node system, the present invention can also be used with a single computer system for synchronizing various applications as they share data on a shared storage.

Shared storage can be any storage device, such as hard drive disks, compact disks, tape, and random access memory. A filesystem is a logical entity built on the shared storage. Although the shared storage is typically considered a physical device while the filesystem is typically considered a logical structure overlaid on part of the storage, the filesystem is sometimes referred to herein as shared storage for simplicity. For example, when it is stated that shared storage fails, it can be a failure of a part of a filesystem, one or more filesystems, or the physical storage device on which the filesystem is overlaid. Accordingly, shared storage, as used herein, can mean the physical storage device, a portion of a filesystem, a filesystem, filesystems, or any combination thereof.

Figure 2:
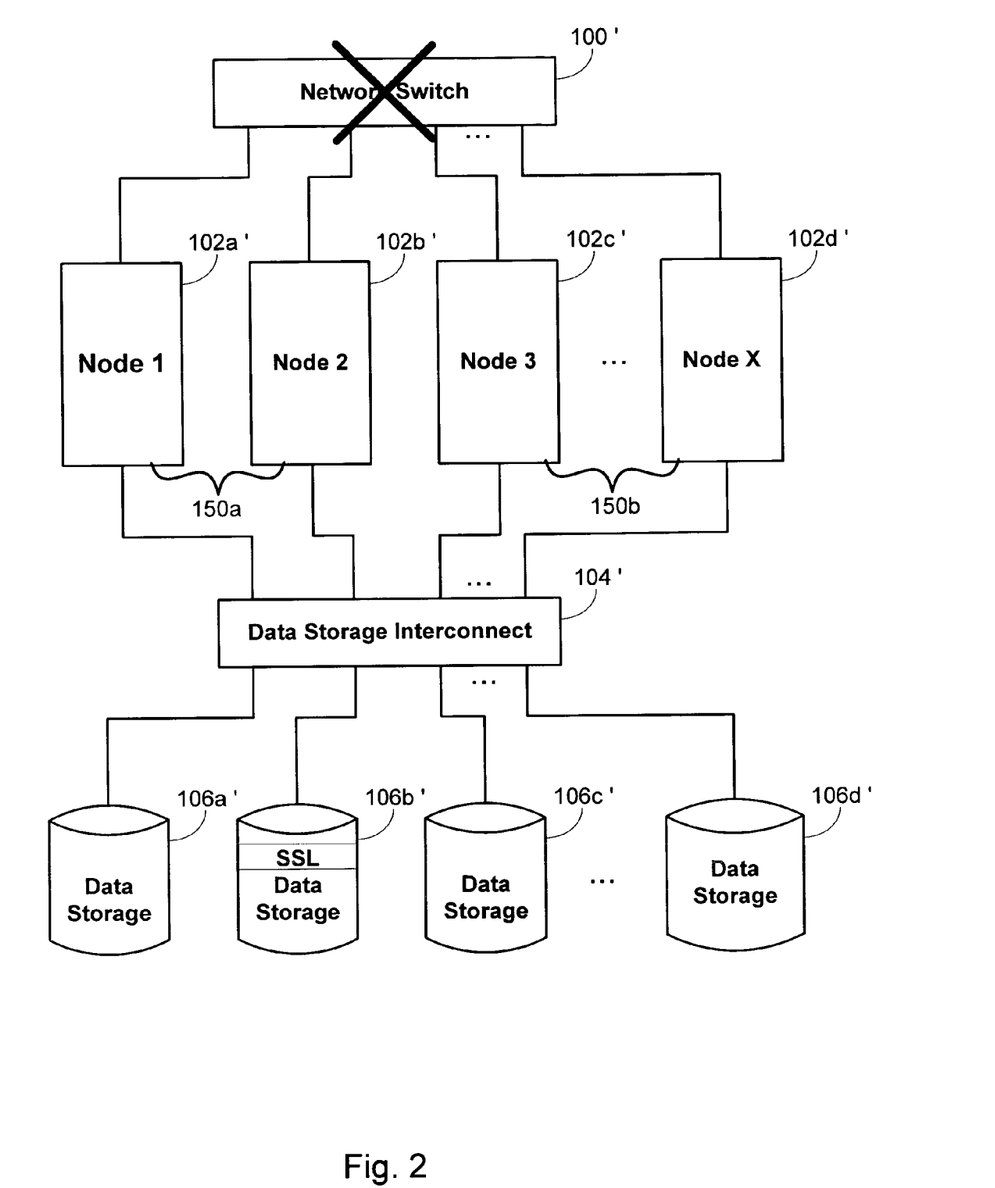
FIG. 2 is a block diagram of an example of a communications failure of a shared storage system.

FIG. 2 is a similar block diagram to FIG. 1, illustrating a network communications failure. In this example, the network switch 100' is shown to have failed. If the network 100' connection failed between node 102B' and node 102C' then the shared storage system would have cluster 150A which includes 102A' and 102B', and cluster 150B which includes node 102C' and 102D'. The nodes 102A' and 102B' within cluster 150A can communicate with each other but can no longer communicate with nodes 102C' and 102D'. Likewise, nodes 102C' and 102D' of cluster 150B can communicate with each other but can no longer communicate with nodes 102A' and 102B'.

In this instance, nodes within each cluster 150A–150B could coordinate which node obtains access to shared data, but neither of the clusters 150A–150B would be able to communicate through the network switch 100' to coordinate which node 102A'–102D' would obtain access to alter shared data. In an embodiment of the present invention, a lock is used to solve this problem and to allow synchronization between negotiators. Negotiators, as used herein, can be any device, application, group of devices or applications, or any combination thereof that may attempt to use the lock. Examples of negotiators include but are not limited to servers, nodes, computers, clusters and applications. In the example of the clusters 150A–150B, node 102A can obtain the lock 120 (FIG. 3) and block off nodes 102C–102D of cluster 150B to avoid confusion.

Figure 3:
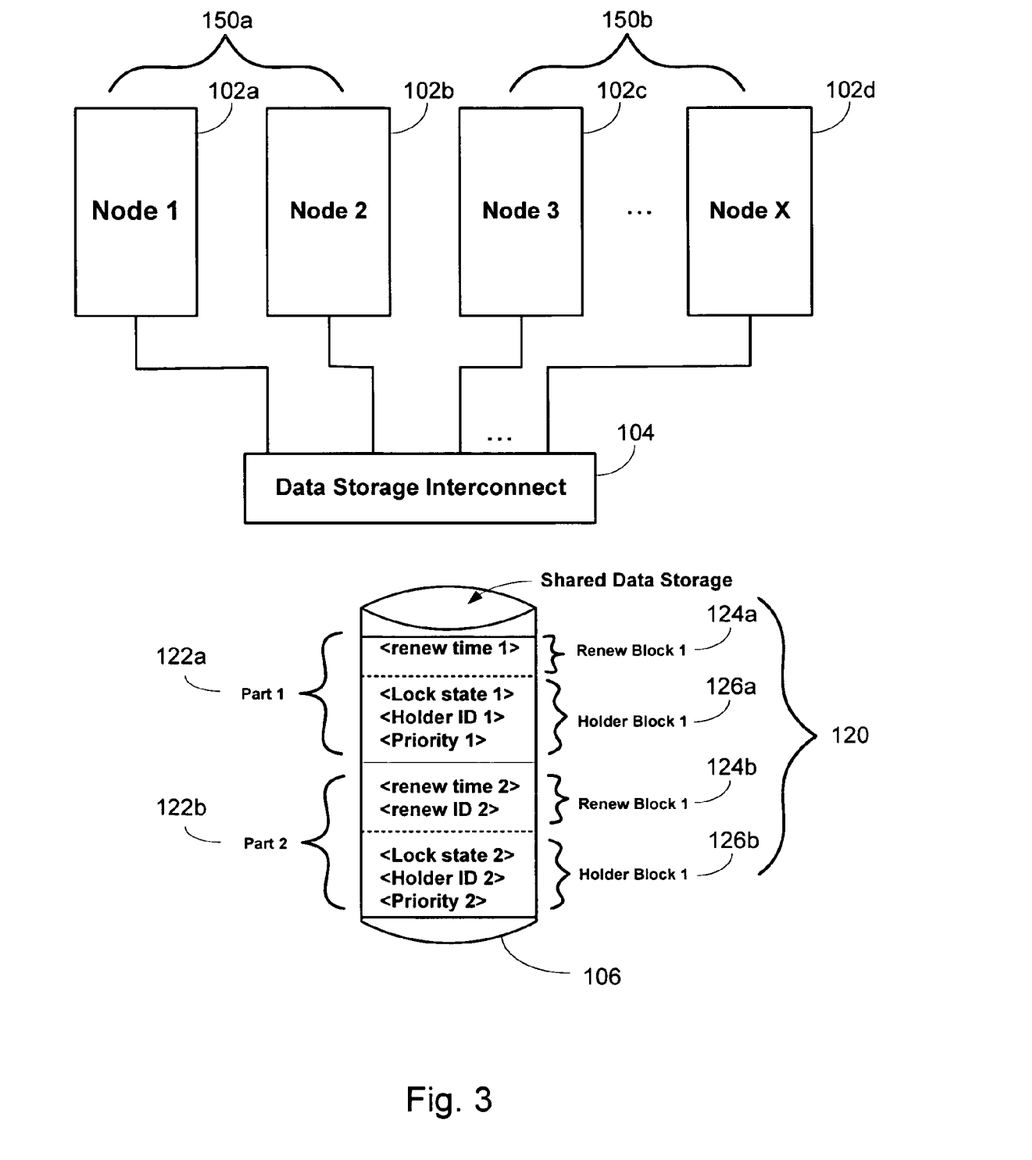
FIG. 3 is a block diagram of a lock according to an embodiment of the present invention.

FIG. 3 shows a lock according to an embodiment of the present invention. In this example, only a single shared storage 106 is shown for clarity, however, the system shown in FIG. 3 can accommodate a large number of shared storage units.

In this example, a lock 120 is shown to be included within the shared storage 106. The embodiment shown in FIG. 3 shows a lock 120 including two parts 122A and 122B. An example of the size of reserved space for parts 122A–122B is four disk sectors. Within each part 122A–122B, the reserved space can be optionally split into blocks. For example, part 122A can include a renew block and a holder block. The renew block 124A is shown to include a renew time. The holder block 126A is shown to include a lock state, a holder ID, and a priority. Likewise, renew block 124B is shown to include renew time and renew ID, while holder lock 126B is shown to include lock state, holder ID, and priority. Further details of these features will be discussed in conjunction with the following flow diagrams.

FIG. 4 shows a flow diagram of method according to an embodiment of the present invention for obtaining a lock. This example can correspond with lock 120 of FIG. 3 which includes parts 122A–122B, however, the examples shown in block 124A–124B and 126A–126B can apply but does not need to apply to the method shown in FIG. 4.

Figure 4A:
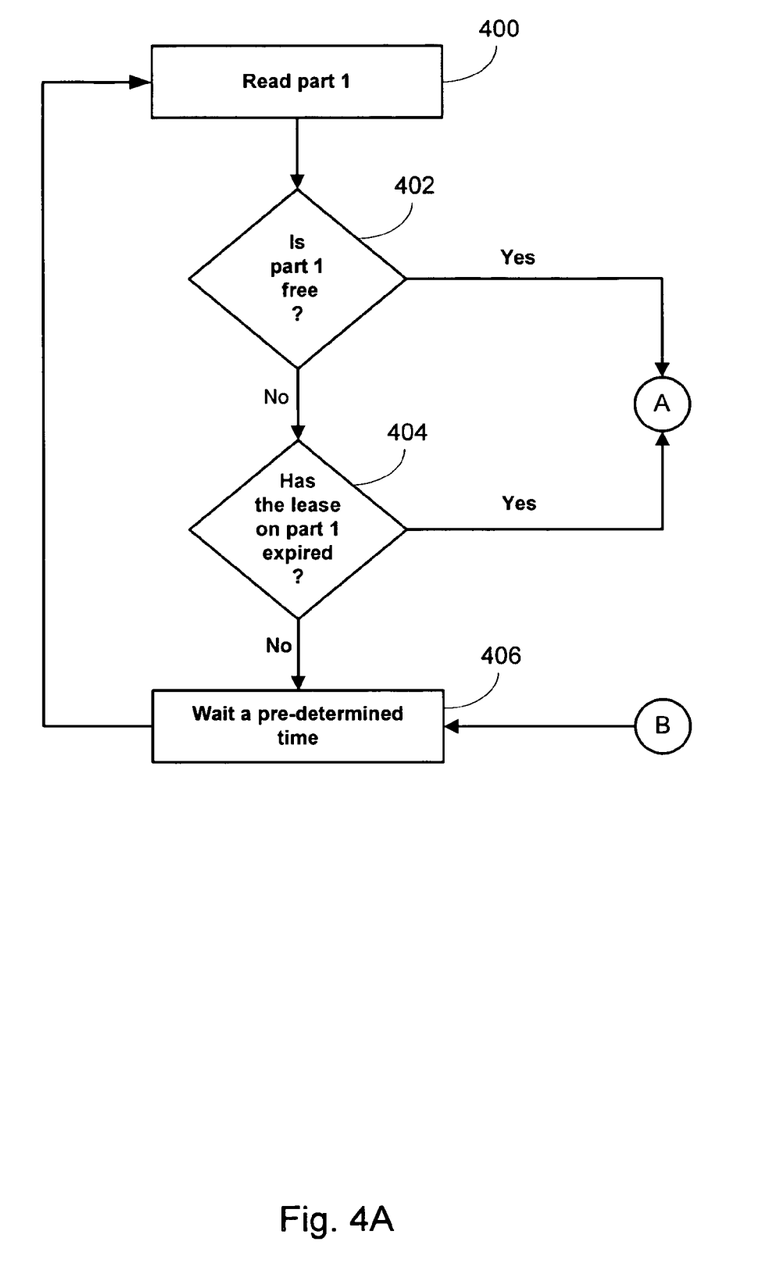
FIGS. 4A–4D are flow diagrams of a method according to an embodiment of the present invention for obtaining a lock.

In this example a requesting node reads part one of the lock (400). It is then determined whether the part one of the lock is available (402). For example, the requesting node can read the Lock State of part one 122A of FIG. 3. If the Lock State deems the lock free, then it is available. If, however, the Lock State deems the lock unavailable, then the requesting node reads the Holder ID of part one 122A. If there is no Holder ID, or if the Holder ID identifies the lock as being available, then it can be determined that the lock is available.

If part one is not free (402), then it is determined whether a lease on part one has expired (404). An example of a lease is when a node obtains a lock for a predefined time period. In order to maintain the lock, the node renews the lease. In this example, the node leases part one of the lock. The requesting node reads a renew time of part one of the lock. It is then determined whether a mark or unique identifier, such as a time stamp or a progressive sequence of numbers, of the renew time has changed within a predetermined period of time. An example of how often the timestamp is updated is five seconds. In the example shown in FIG. 3, the time stamp is identified as <renew time 1>. If the time stamp has not changed in the predetermined period of time, then the lease is deemed to have expired. If the time stamp has changed in the predetermined period of time, then it is assumed that the current lock holder is still active and validly holding the lock. Accordingly, the requesting node attempts again to obtain the lock by reading part one.

If the lease on part one has not yet expired (404), then this node waits a predetermined amount of time (406). An example of the predetermined amount of time is five seconds. Afterwards, part one is read again (400).

If part one is free (402), or if the lease on part one has expired (404), then an ID is written in to part one (410). The ID is preferable a unique entry written by the requesting node which can be any identifiable notation that can be associated with the requesting node. This unique entry is sometimes referred to as holder ID.

Figure 4B:
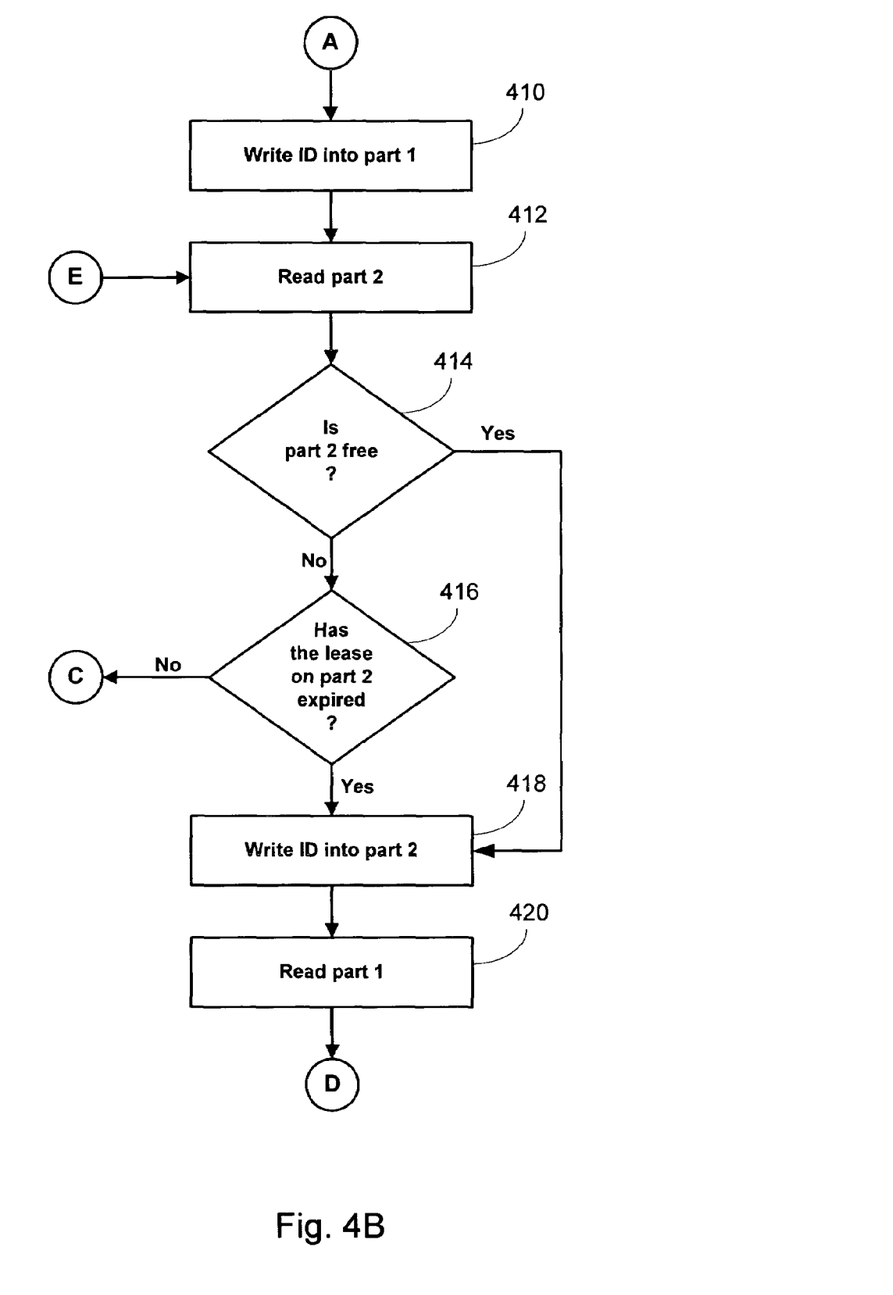

Part two is then read (412). It is then determined whether part two is free (414). If part two is available, then the ID of the requesting node is written into part two. If, however, part two is not available, then it is determined whether the lease has expired on part two (416). An example of when part two would not be available is if there is a holder ID of another node already written into part two. The lease of part two can also utilize a time stamp, such as a predetermined time period of five seconds. In the example shown in FIG. 3, the time stamp is identified as <renew time 2>. If the time stamp has changed in the predetermined period of time, then it is assumed that the current lock holder is still active and validly holding the lock.

If the lease has expired, then the requesting node's ID is written into part two (418). Then part one is again read (420).

Figure 4C:
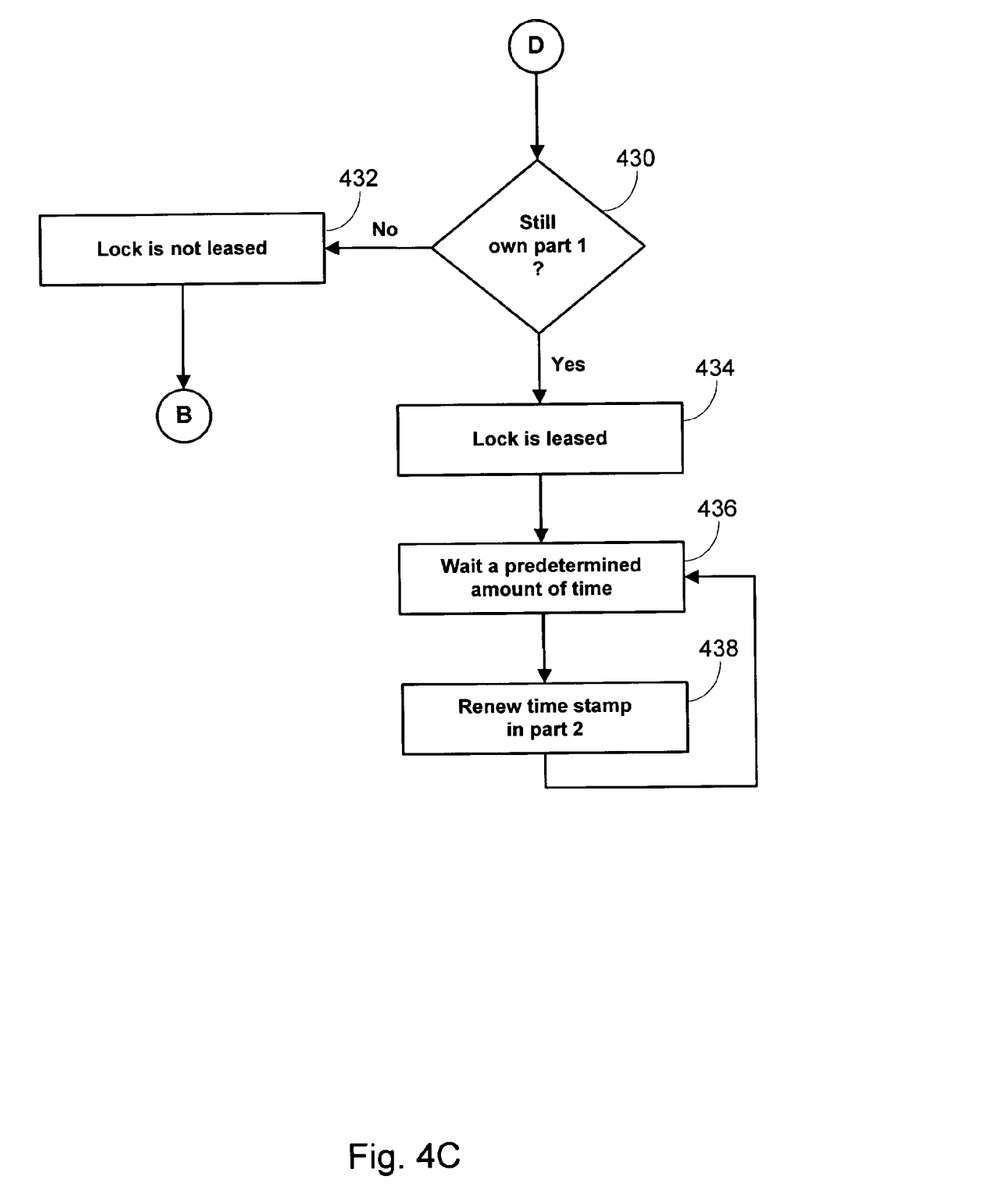

It is then determined whether the requesting node still owns part one (430). For example, if the requesting nodes ID is still written into part one, then it still owns part one. If it still owns part one (430), then the lock is now leased to the requesting node (434). A predetermined amount of time is waited (436), such as five seconds, and then the time stamp in part two is renewed (438).

If the requesting node does not still own part one (430), then the lock is not leased to the requesting node (432), and the requesting node waits a predetermined amount of time (406 of FIG. 4A) before reading part one again (400).

Figure 4D:
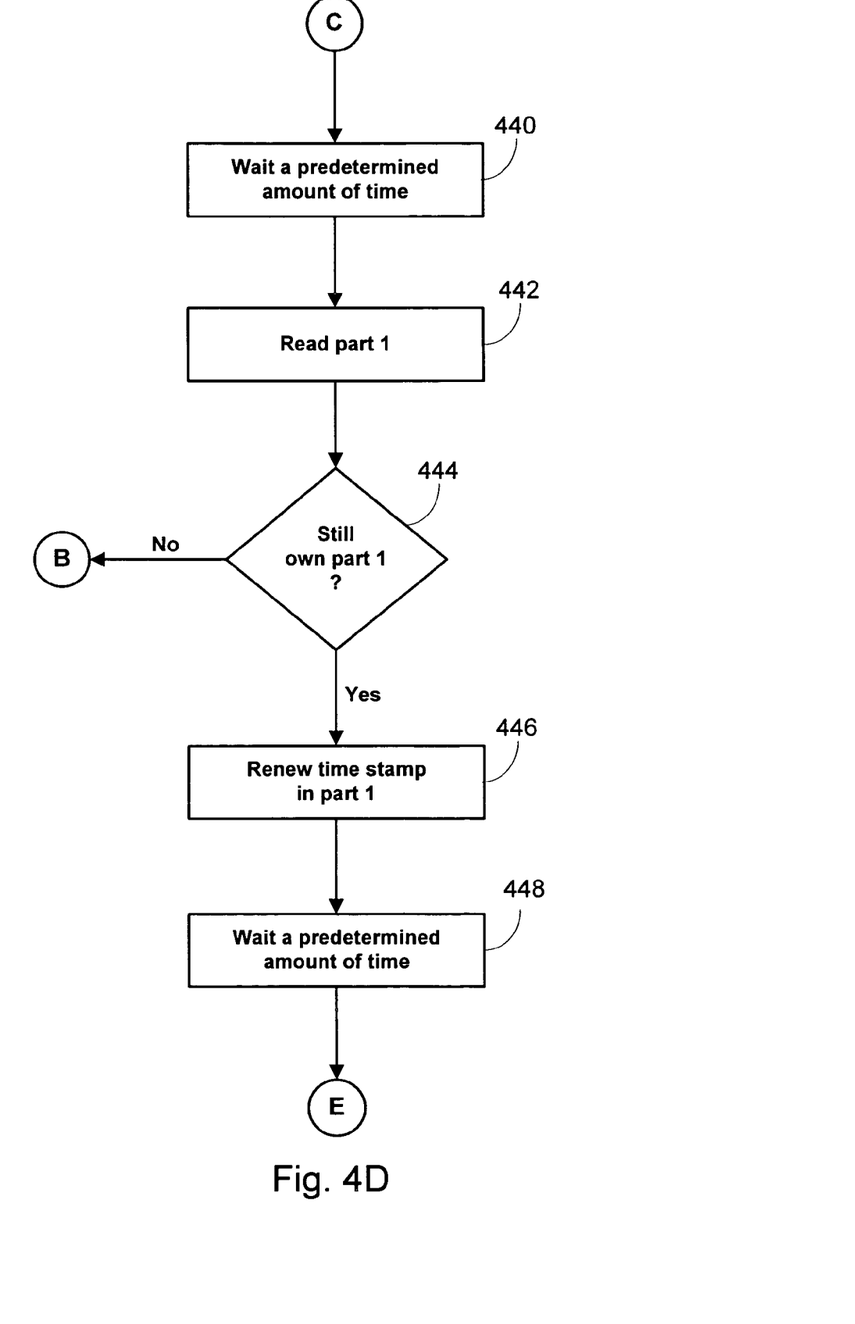

If the lease on part two has not expired (416 of FIG. 4B), then the requesting node waits a predetermined amount of time (440), such as five seconds, and then reads part one (442). It is then determined whether the requesting node still owns part one (444). If it still owns part one, then the time stamp in part one is renewed (446). Thereafter, a predetermined amount of time is again waited (446). Thereafter, part two is again read (412 FIG. 4B).

It is preferable to have this predetermined time interval for the renewing of the time stamp be shorter than the amount of time that is required to wait before being able to grab the lock away from the current holder of the lock, such as the lease time of step 416 of FIG. 4B. An example of the time interval between renewing the time stamp (438) is one second while an example of the lease time (416) is five seconds. In this manner, ordinary delays can occur before the lock can be taken away form the current holder.

An advantage to leasing the lock in this manner rather than owning the lock is that in case the node which holds the lock fails, then after a predetermined amount of time, another node is able to take the lock away from the failed node so that the lock is not frozen and unavailable to the rest of the system.

Additionally, because renewal information is preferably kept in a separate block from holder information, the time stamp in part two can be renewed by any node that has been authorized to do so by the node that currently holds the lock without over-writing the holder information. For example, if node 102A currently leases lock 120 of FIG. 3, then node 102B can also renew the time stamp in part two (438 of FIG. 4C) on behalf of node 102A if it has been authorized to do so by node 102A. This feature can keep the lock from being inadvertently dropped if the holder of the lease on the lock becomes too busy for some period to renew its lease on the lock.

Figure 5:
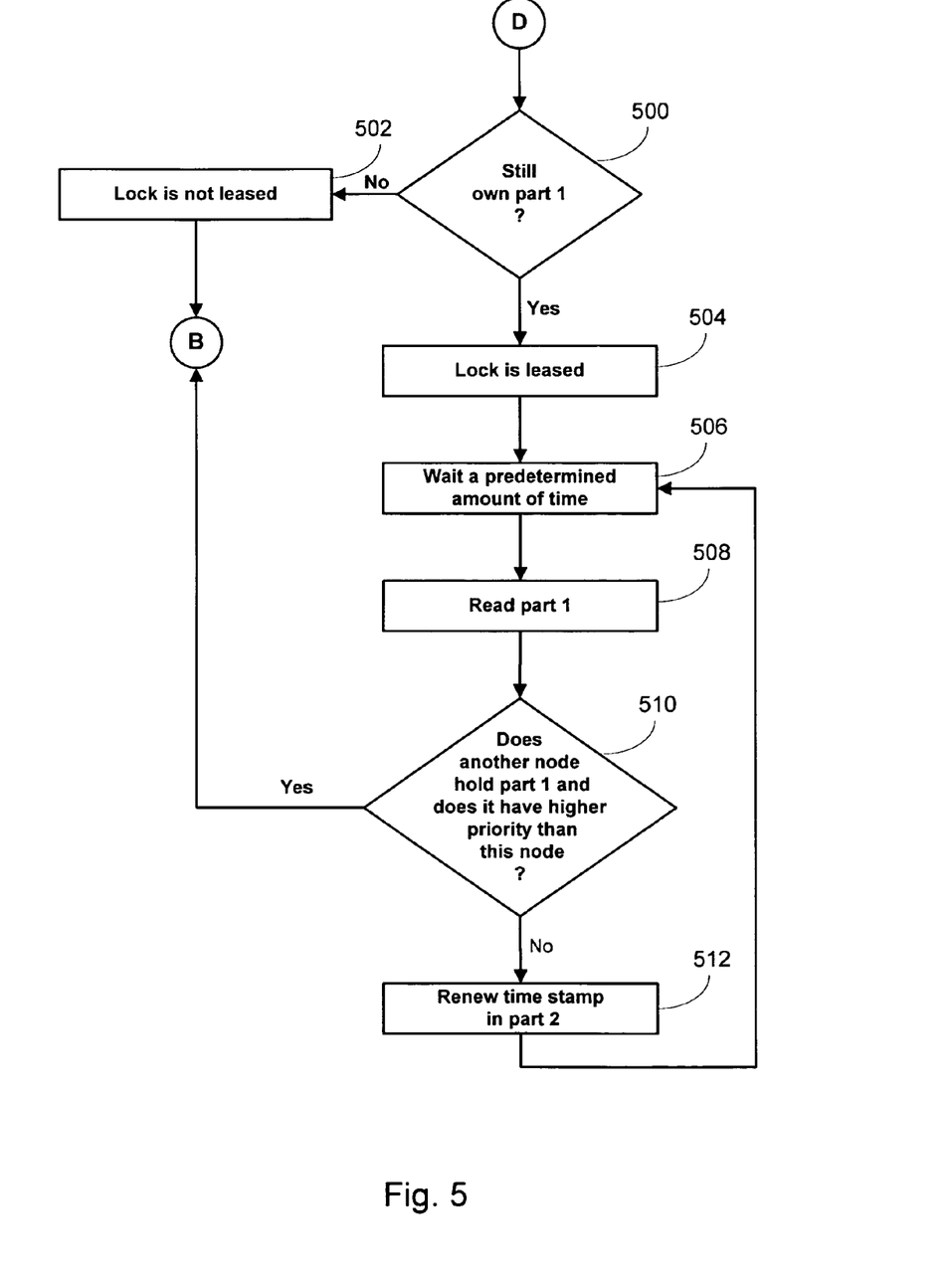
FIG. 5 is a flow diagram of a method for synchronizing locks using priority according to another embodiment of the present invention.

FIG. 5 is a flow diagram of a method of synchronizing access according to another embodiment of the present invention. In this embodiment, the method utilizes priority factors. This embodiment differs from the previous embodiment shown in FIGS. 4A–4D in the way a node acquires part one of the lock. When a node acquires part one of the lock, it writes its priority into part one of the lock along with its unique identifier. If the priority of that node later changes, it updates its priority in part one of the lock. If another node then attempts to acquire part one of the lock, it first reads part one of the lock, then determines if there is a current holder of the lock, and if so, determines whether that node has a lower priority than itself. If so, the node is allowed to acquire part one of the lock without checking if the current holder is renewing its lease on the lock. Essentially, a node is allowed to steal part one of the lock from a lower priority holder. The priority can be any value or set of values.

FIGS. 4A–4B, and 4D are substantially the same for this embodiment except that step 402 of FIG. 4A determines whether part one is free or whether the requesting node has a higher priority then the holder of part one. Additionally, FIG. 4C would be substituted with FIG. 5. In FIG. 5, it is determined whether the requesting node still owns part one (500). If it does still own part one, then the lock is leased to the requesting node (504). A predetermined amount of time is then waited (506), and part one is read again (508). It is then determined whether another node holds part one and whether it has a higher priority than this node (510). If another node does not hold part one or another node holds part one but does not have higher priority than this node, then the time stamp in part two is renewed (512), and a predetermined amount of time is again waited (506).

An example of how this determination of priority can be made is to compare <priority 2> to <priority 1> as shown in FIG. 3. <priority 2> is the priority of the current lock holder while <priority 1> is the priority of the requesting node that has claimed part one of the lock but cannot claim part two since it is already taken.

If another node does hold part one and it does have a higher priority than this node (510), then it waits a predetermined amount of time (406 of FIG. 4A) and again reads part one (400).

If this node no longer owns part one (500 of FIG. 5), then the lock is not leased to this node (502), and a predetermined amount of time is waited (406 of FIG. 4A) before rereading part one (400).

An advantage of the present invention is that an atomic test-and-set, atomic swap, or equivalent operation is not required on the shared storage. A further advantage of the present invention is that a fixed, predictable amount of space is used by the lock regardless of the number of negotiators. A further advantage of the present invention is that the set of negotiators can be dynamic without interruption to the locking mechanism. For example, if a negotiator or holder of the lock fails, then the lock will automatically be obtained by another negotiator as illustrated in FIGS. 4A–4D and 5. Likewise, if an additional negotiator is added to the shared storage system, then the locking mechanism according to an embodiment of the present invention does not need to be altered to account for the change. A further advantage of the present invention is that it does not require that clocks be synchronized among the negotiators.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of synchronizing access comprising:
providing a lock, wherein the lock includes a first part and a second part;
writing a first entry to the first part without determining that the second part is available, wherein the first entry includes an identifier associated with a first negotiator;
determining, subsequent to writing the first entry to the first part, that the second part is available;
writing a second entry to the second part based at least in part on the determination that the second part is available;
reading the first part;
determining whether the first entry is read from the first part; and
obtaining the lock if the first entry is read from the first part.

2. The method of claim 1, wherein writing a first entry to the first part occurs after determining that the first part is available.

3. The method of claim 1, wherein writing a second entry to the second part occurs after determining that the second part is available.

4. The method of claim 1, further comprising:
writing a time stamp;
waiting a predetermined amount of time; and
updating the time stamp.

5. The method of claim 1, further comprising:
writing a mark;
waiting a predetermined amount of time; and
updating the mark.

6. The method of claim 1, further comprising:
reading a time stamp;
determining whether the time stamp has changed within a predetermined amount of time; and
writing the first entry to the first part if the time stamp has not changed within the predetermined amount of time.

7. A system of synchronizing access comprising:
a shared storage including a lock, wherein the lock includes a first part and a second part; and
a plurality of negotiators, wherein at least one of the plurality of negotiators is configured to:
write a first entry to the first part without determining that the second part is available, wherein the first entry includes an identifier associated with a first negotiator;
determine, subsequent to writing the first entry to the first part, that the second part is available;
write a second entry to the second part based at least in part on the determination that the second part is available,
read the first part;
determine whether the first entry is read from the first part; and
obtain the lock if the first entry is read from the first part.

8. A system of synchronizing access comprising: a processor configured to:
write a first entry to a first part of a lock without determining that a second part of the lock is available, wherein the first entry includes an identifier associated with a first negotiator;
determine, subsequent to writing the first entry to the first part, that the second part is available;
write a second entry to the second part based at least in part on the determination that the second part is available;
write a second entry to the second part of the lock;
read the first part;
determine whether the first entry is read from the first part; and
obtain the lock if the first entry is read from the first part;
a memory coupled to the processor, the memory being configured to provide the processor with instructions.

9. A computer program product for synchronizing access, the computer program product being embodied in a computer readable medium and comprising computer instructions for:
providing a lock, wherein the lock includes a first part and a second part;
writing a first entry to the first part without determining that the second part is available, wherein the first entry includes an identifier associated with a first negotiator;
determining, subsequent to writing the first entry to the first part, that the second part is available;
writing a second entry to the second part based at least in part on the determination that the second part is available;
reading the first part;
determining whether the first entry is read from the first part; and
obtaining the lock if the first entry is read from the first part.

10. A method as recited in claim 1, further comprising:
waiting a predetermined amount of time, during which data associated with the lock can be accessed by a lock owner associated with the lock;

determining whether a second negotiator is attempting to obtain the lock; and renewing the lock if it is determined that no negotiator is attempting to obtain the lock or if the second negotiator attempting to obtain the lock has associated with it a first priority that is lower than a current priority associated with the lock owner.

11. A method as recited in claim 1, further comprising:

waiting a predetermined amount of time, during which data associated with the lock can be accessed by a lock owner associated with the lock;

determining whether a second negotiator is attempting to obtain the lock; and renewing the lock if it is determined that the second negotiator attempting to obtain the lock has associated with it a first priority that is lower than is lower than a current priority associated with the lock owner.

12. A method as recited in claim 1, further comprising:

waiting a predetermined amount of time, during which data associated with the lock can be accessed by a lock owner associated with the lock; and renewing the lock by modifying at least a portion of data contained in the second part if more time is needed to continue accessing the data associated with the lock.

13. A system as recited in claim 7, wherein the at least one of the plurality of negotiators is further configured to:

wait is predetermined amount of time, during which data associated with the lock can be accessed by a lock owner associated with the lock;

determine whether a second negotiator is attempting to obtain th lock; and renew the lock if it is determined than no negotiator is attempting to obtain the lock or if the second negotiator attempting to obtain the lock has associated with it a first priority that is lower than a current priority associated with the lock owner.

14. A system as recited in claim 7, wherein the at least one of the plurality of negotiators is further configured to:

wait a predetermined amount of time, during which data associated with the lock can be accessed by a lock owner associated with the lock;

determine whether a second negotiator is attempting to obtain the lock; and renew the lock if it is determined that the second negotiator attempting to obtain the lock has associated with it a first priority that is lower than a current priority associated with the lock owner.

15. A system as recited in claim 7, wherein the at least one of the plurality of negotiators is further configured to:

wait a predetermined amount of time, during which data associated with the lock can be accessed by a lock owner associated with the lock; and renew the lock by modifying at least a portion of data contained in the second part if more time is needed to continue accessing the data associated with the lock.

16. A system as recited in claim 8, wherein the processor is further configured to:

wait a predetermined amount of time, during which data associated with the lock can be accessed by a lock owner associated with the lock;

determine whether a second negotiator is attempting to obtain the lock; and renew the lock if it is determined that no negotiator is attempting to obtain the lock or if the second negotiator attempting to obtain the lock has associated with it a first priority that is lower than a current priority associated with the lock owner.

17. A system as recited in claim 8, wherein the processor is further configured to:

wait a predetermined amount of time, during which data associated with the lock can be accessed by a lock owner associated with the lock;

determine whether a second negotiator is attempting to obtain the lock; and renew the lock if it is determined that the second negotiator attempting to obtain the lock has associated with it a first priority that is lower than a current priority associated with the lock owner.

18. A system as recited in claim 8, wherein the processor is further configured to:

wait a predetermined amount of time, during which data associated with the lock can be accessed by a lock owner associated with the lock; and renew the lock by modifying at least a portion of data contained in the second part if more time is needed to continue accessing the data associated with the lock.

19. A computer program product as recited in claim 9, further computer instructions for:

waiting a predetermined amount of time, during which data associated with the lock can be accessed by a lock owner associated with the lock;

determining whether a second negotiator is attempting to obtain the lock; and renewing the lock if it is determined that no negotiator is attempting to obtain the lock or if the second negotiator attempting to obtain the lock has associated with it a first priority that is lower than a current priority associated with the lock owner.

20. A computer program product as recited in claim 9, further comprising computer instructions for:

waiting a predetermined amount of time, during which data associated with the lock can be accessed by a lock owner associated with the lock;

determining whether a second negotiator is attempting to obtain the lock; and renewing the lock if it is determined that the second negotiator attempting to obtain the lock has associated with it a first priority that is lower than a current priority associated with the lock owner.

21. A computer program product as recited in claim 9, further comprising computer instructions for:

waiting a predetermined amount of time, during which data associated with the lock can be accessed by a lock owner associated with the lock; and renewing the lock by modifying at least a portion of data contained in the second part if more time is needed to continue accessing the data associated with the lock.

* * * * *